United States Patent
Cudak et al.

(10) Patent No.: US 9,426,028 B2
(45) Date of Patent: Aug. 23, 2016

(54) CONFIGURING A COMPUTING SYSTEM TO DELAY A SYSTEM UPDATE

(71) Applicant: LENOVO ENTERPRISE SOLUTIONS (SINGAPORE) PTE. LTD., Singapore (SG)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 163 days.

(21) Appl. No.: 14/300,515

(22) Filed: Jun. 10, 2014

(65) Prior Publication Data

US 2015/0358206 A1 Dec. 10, 2015

(51) Int. Cl.
*G06F 9/445* (2006.01)
*H04L 12/24* (2006.01)
*H04L 29/08* (2006.01)
*G06F 9/44* (2006.01)

(52) U.S. Cl.
CPC .............. *H04L 41/0816* (2013.01); *G06F 8/65* (2013.01); *G06F 8/70* (2013.01); *H04L 41/0813* (2013.01); *H04L 67/10* (2013.01); *H04L 67/16* (2013.01)

(58) Field of Classification Search
CPC ..... G06F 21/564; G06F 21/572; G06F 21/57; G06F 8/65; G06F 8/665; G06F 9/4411; G06F 9/45537; G06F 8/70; G06Q 30/0601; H04L 41/0813; H04L 41/0816
See application file for complete search history.

(56) References Cited

U.S. PATENT DOCUMENTS

| 2002/0095454 A1* | 7/2002 | Reed ................. G06Q 30/0601 709/201 |
| 2008/0005146 A1 | 1/2008 | Kubo et al. |
| 2009/0178033 A1* | 7/2009 | Challener .......... G06F 9/45537 717/168 |
| 2011/0131447 A1* | 6/2011 | Prakash ............... G06F 21/572 714/19 |

(Continued)

OTHER PUBLICATIONS

Anonymous, "Self-Healing Metadata Based on Application Feedback", Technical Disclosure, IP.com Prior Art Database (online publication), Aug. 2011, pp. 1-4, IP.com No. IPCOM000209630D.

(Continued)

*Primary Examiner* — Le H Luu
(74) *Attorney, Agent, or Firm* — Edward J. Lenart; Katherine S. Brown; Kennedy Lenart Spraggins LLP

(57) ABSTRACT

Configuring a computing system to delay a system update, including: receiving, by an update management module, an update descriptor associated with an available system update, the update descriptor including information identifying a targeted system configuration to be updated by the available system update; determining, by the update management module, whether the available system update should be blocked; responsive to determining that the available system update should be blocked, determining, by the update management module, whether the computing system can be reconfigured such that the computing system does not operate using the targeted system configuration; and responsive to determining that the computing system can be reconfigured such that the computing system does not operate using the targeted system configuration, reconfiguring, by the update management module, the computing system to operate without using the targeted system configuration.

19 Claims, 5 Drawing Sheets

(56) References Cited

U.S. PATENT DOCUMENTS

| | | | |
|---|---|---|---|
| 2012/0240236 A1* | 9/2012 | Wyatt | G06F 21/564 726/25 |
| 2012/0246124 A1 | 9/2012 | Arasaratnam | |
| 2013/0138783 A1* | 5/2013 | Mallur | G06F 8/65 709/221 |
| 2013/0326493 A1* | 12/2013 | Poonamalli | G06F 8/65 717/168 |
| 2013/0332924 A1* | 12/2013 | Shaposhnik | G06F 21/57 718/1 |
| 2014/0007067 A1* | 1/2014 | Nelson | G06F 8/665 717/168 |
| 2014/0007069 A1* | 1/2014 | Cavalaris | G06F 8/665 717/170 |
| 2014/0282480 A1* | 9/2014 | Matthew | G06F 8/65 717/172 |
| 2014/0359593 A1* | 12/2014 | Cohen | G06F 8/65 717/169 |
| 2014/0372739 A1* | 12/2014 | Arroyo | G06F 8/665 713/2 |
| 2014/0380340 A1* | 12/2014 | Knichel | G06F 9/4411 719/327 |

OTHER PUBLICATIONS

Arnold, "Implementing IBM InfoSphere Change Data Capture for DB2 z/OS V6.5", Redpaper, IBM.com/redbooks (online publication), Jul. 2011, pp. 1-64, IBM Corporation, Armonk, NY.

Halevy et al., "Object-Based Parallel NFS (pNFS) Operations", Technical Disclosure, IP.com Prior Art Database (online publication), Feb. 2010, pp. 1-71, IP.com No. IPCOM000193093D.

"Technical Reference for the Prerequisite Checker in Configuration Manager", technet.microsoft.com (online publication), Nov. 2013, pp. 1-29, URL: http://technet.microsoft.com/en-us/library/hh368980.aspx.

Anonymous, "Method and System for Promoting System Stability by Adaptive Re-rendering of System Profile Data", Technical Disclosure, IP.com Prior Art Database (online publication), Sep. 2013, pp. 1-3, IP.com No. IPCOM000230867D.

* cited by examiner

CONFIGURING A COMPUTING SYSTEM TO DELAY A SYSTEM UPDATE

BACKGROUND OF THE INVENTION

1. Field of the Invention

The field of the invention is data processing, or, more specifically, methods, apparatuses, and products for configuring a computing system to delay a system update.

2. Description of Related Art

Modern computing systems can include a wide array of software components that may be updated periodically. Such updates may occur automatically as new versions of software applications, operating systems, device drivers, and other components are released. Such updates, while frequently helpful in the long run, may sometimes cause problems as the computing system may not be ready for the administrative overhead associated with performing an update. For example, a computing system may not be ready for an update because the computing system is processing important jobs and the update requires a system reboot to complete the system update. Likewise, a computing system may not be ready for an update because the update alters a version of software utilized by the computing system from a version that is approved by a system administrator to a version that is not approved by the system administrator.

SUMMARY OF THE INVENTION

Methods, apparatuses, and products for configuring a computing system to delay a system update, the including: receiving, by an update management module, an update descriptor associated with an available system update, the update descriptor including information identifying a targeted system configuration to be updated by the available system update; determining, by the update management module, whether the available system update should be blocked; responsive to determining that the available system update should be blocked, determining, by the update management module, whether the computing system can be reconfigured such that the computing system does not operate using the targeted system configuration; and responsive to determining that the computing system can be reconfigured such that the computing system does not operate using the targeted system configuration, reconfiguring, by the update management module, the computing system to operate without using the targeted system configuration.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
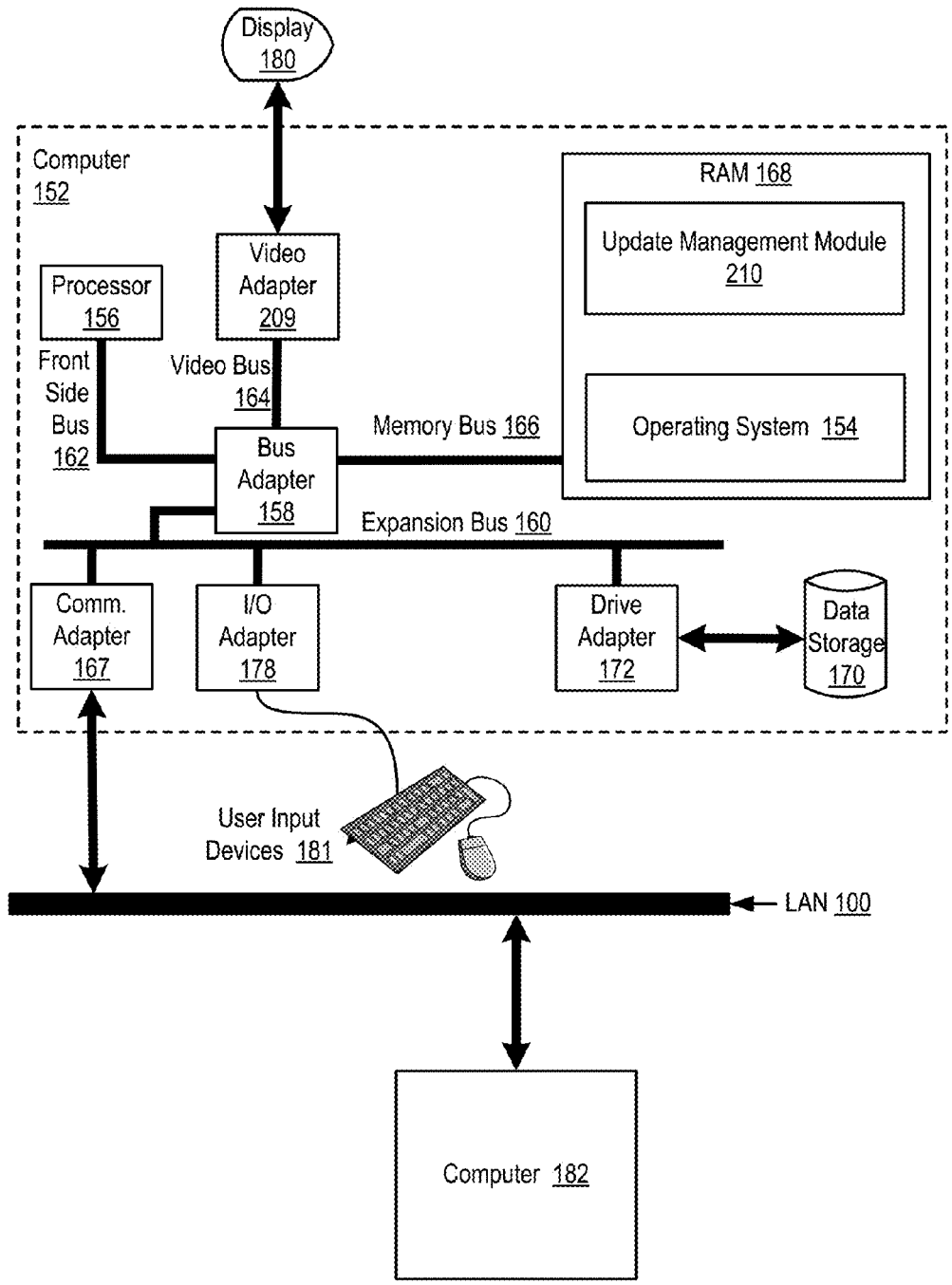
FIG. 1 sets forth a block diagram of automated computing machinery comprising an example computing system useful in delaying a system update according to embodiments of the present invention.

Example methods, apparatuses, and products for configuring a computing system to delay a system update in accordance with the present invention are described with reference to the accompanying drawings, beginning with FIG. 1. FIG. 1 sets forth a block diagram of automated computing machinery comprising an example computing system, depicted here as computer (152), useful in delaying a system update according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The computer (152) of FIG. 1 operates using a plurality of system configuration settings. Each system configuration setting defines some operational aspect of the computer (152). Each system configuration setting can define, for example, as aspect of the operation of the operating system of the computer (152), an aspect of the operation of the device drivers for devices installed in the computer (152), an aspect of the operation of software applications installed on the computer (152), and so on.

Stored in RAM (168) is an update management module (210), a module of computer program instructions for configuring a computing system to delay a system update according to embodiments of the present invention. The update management module (210) may configure the computer (152) to delay a system update by receiving an update descriptor associated with an available system update. The update descriptor may be embodied, for example, as a data structure that includes information identifying and describing an available system update that has been targeted for installation on the computer (152). Such a system update may be configured to perform certain updates to software installed on the computer (152) such as, for example, installing a new version of a particular piece of software, updating the operating system of the computer (152), updating device drivers installed on the computer (152), and so on. The update descriptor may include, for example, information identifying software modules that will be updated by the available system update, information identifying how critical the available system update is to the computer (152), information identifying whether the computer (152) will need to reboot in order for the available system update to be fully implemented, information identifying the types of bugs that the available system update is designed to correct, and so on.

The update descriptor can also include information identifying a targeted system configuration to be updated by the available system update. The information identifying the targeted system configuration to be updated may be embodied, for example, as an identifier of a particular system configuration setting that will be modified by performing the available system update, as an identifier of a software application that will be modified by performing the available system update, and so on. Through the receipt of such an update descriptor, the update management module (210) may receive information that enables the update management module (210) to identify those system configuration settings that will be modified by performing the available system update.

The update management module (210) may further configure the computer (152) to delay a system update by determining whether the available system update should be blocked. The update management module (210) may determine that the available system update should be blocked, for example, when performing the available system update would alter the code level of some software on the computer (152), such that the computer (152) would be utilize a version of the software that has not be certified as an approved version of the software for use by computing systems (208) in a data center, blade center, or larger data processing system. The update management module (210) may alternatively determine that the available system update should be blocked, for example, when performing the available system update requires that the computer (152) be rebooted as the computer (152) may be performing some critical processing jobs that should not be interrupted. Readers will appreciate that the update management module (210) may determine that the available system update should be blocked for a variety of reasons in accordance with embodiments of the present invention. The update management module (210) may therefore determine whether the available system update should be blocked by inspecting information contained in the update descriptor to identify system configurations settings that will be impacted by the available system configuration, by inspecting information contained in the update descriptor to identify whether performing the available system configuration requires a reboot of the computer (152), and so on.

The update management module (210) may further configure the computer (152) to delay a system update by determining whether the computer (152) can be reconfigured such that the computer (152) does not operate using the targeted system configuration. Readers will appreciate that some system configuration settings may be optional in the sense that the system configuration settings merely extend the functionality of the computer (152) in ways that are not required, the system configuration settings enable functionality that may be achieved in other ways, and so on. As such, some of the system configuration settings may not be absolutely crucial to system performance and may be disabled, or replaced by alternative system configuration settings, without impacting the ability of the computer (152) to perform its more critical operations in a manner that is unacceptable to the update management module (210). Each system configuration setting may therefore be associated with a criticality level that identifies how critical it is that the computer (152) has a particular system configuration setting enabled. In the example depicted in FIG. 1, the update management module (210) may determine whether the computer (152) can be reconfigured such that the computer (152) does not operate using the targeted system configuration by searching for suitable alternatives to the targeted system configuration, by determining whether the targeted system configuration is so critical that is may not be disabled, and so on.

The update management module (210) may further configure the computer (152) to delay a system update by reconfiguring the computer (152) to operate without using the targeted system configuration. Readers will appreciate that by reconfiguring the computer (152) to operate without using the targeted system configuration, the system update associated with the update descriptor may not need to be performed, thereby delaying or eliminating the need for the computer (152) to take on the administrative overhead associated with performing such an update. Reconfiguring the computer (152) to operate without using the targeted system configuration may be carried out, for example, by the update management module (210) changing one or more system configuration settings such that the components of the computing system that are impacted by the system update are no longer utilized by the computer (152), thereby eliminating the need to update such components. In the example depicted in FIG. 1, reconfiguring the computer (152) to operate without using the targeted system configuration is carried out in response to affirmatively determining that the computer (152) can be reconfigured such that the computer (152) does not operate using the targeted system configuration.

Also stored in RAM (168) is an operating system (154). Operating systems useful for configuring the computer (152) to delay a system update according to embodiments of the present invention include UNIX™, Linux™, Microsoft XP™, AIX™, IBM's i5/OS™, and others as will occur to those of skill in the art. The operating system (154) and the update management module (210) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for configuring the computer (152) to delay a system update according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for configuring the computer (152) to delay a system update according to embodiments of the present invention include modems for wired dial-up communications, Ethernet (IEEE 802.3) adapters for wired data communications network communications, and 802.11 adapters for wireless data communications network communications.

Figure 2:
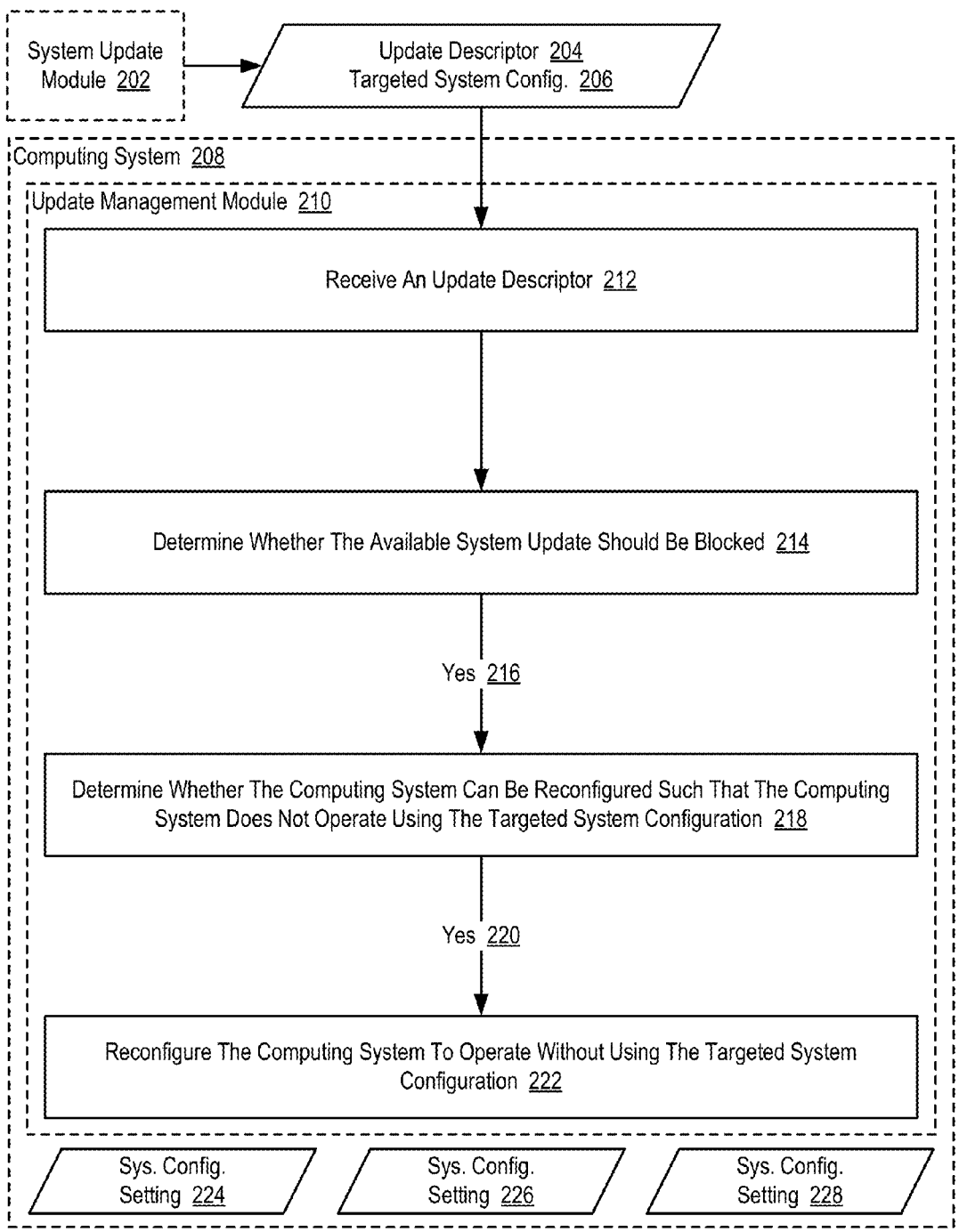
FIG. 2 sets forth a flow chart illustrating an example method for configuring a computing system to delay a system update according to embodiments of the present invention.

For further explanation, FIG. 2 sets forth a flow chart illustrating an example method for configuring a computing system (208) to delay a system update according to embodiments of the present invention. The computing system of FIG. 2 operates using a plurality of system configuration settings (224, 226, 228). Each system configuration setting (224, 226, 228) defines some operational aspect of the computing system (208). Each system configuration setting (224, 226, 228) can identify, for example, some aspect that defines the operation of the operating system of the computing system (208), some aspect that defines the operation of the device drivers for devices installed in the computing system (208), some aspect that defines the operation of software applications installed on the computing system (208), and so on.

The example method depicted in FIG. 2 is carried out, at least in part, by an update management module (210). The update management module (210) depicted in FIG. 2 may be embodied as a module of computer program instructions executing on computer hardware such as, for example, a computer processor. The update management module (210) of FIG. 2 is depicted as residing within the computing system (208). In alternative embodiments, however, the update management module (210) may reside outside of the computing system (208) and be utilized as a service accessible by the computing system (208).

The example method depicted in FIG. 2 includes receiving (212), by the update management module (210), an update descriptor (204) associated with an available system update. The update descriptor (204) of FIG. 2 may be embodied, for example, as a data structure that includes information identifying and describing an available system update that has been targeted for installation on the computing system (208). Such a system update may be configured to perform certain updates to software components installed on the computing system (208) such as, for example, installing a new version of a particular piece of software, updating the operating system of the computing system (208), updating device drivers installed on the computing system (208), and so on. The update descriptor (204) may include, for example, information identifying software modules that will be updated by the available system update, information identifying how critical the available system update is to the computing system (208), information identifying whether the computing system (208) will need to reboot in order for the available system update to be fully implemented, information identifying the types of bugs that the available system update is designed to correct, information identifying a version number for a software application that will be installed or updated by the system update, and so on.

The update descriptor (204) depicted in FIG. 2 also includes information identifying a targeted system configuration (206) to be updated by the available system update. The information identifying the targeted system configuration (206) to be updated may be embodied, for example, as an identifier of a particular system configuration setting (224, 226, 228) that will be modified by performing the available system update, as an identifier of a software application that will be modified by performing the available system update, and so on. By receiving (212) the update descriptor (204), the update management module (210) may receive information that enables the update management module (210) to identify those system configuration setting (224, 226, 228) that will be modified by performing the available system update.

The example method depicted in FIG. 2 also includes determining (214), by the update management module (210), whether the available system update should be blocked. The update management module (210) may determine (214) that the available system update should be blocked, for example, when performing the available system update requires that the computing system (208) be rebooted as the computing system (208) may be performing some critical processing jobs that should not be interrupted. Alternatively, the update management module (210) may determine (214) that the available system update should be blocked, for example, when performing the available system update would alter the code level of some software on the computing system (208), such that the computing system (208) would be utilize a version of the software that has not be certified as an approved version of the software for use by computing systems (208) in a data center, blade center, or larger data processing system. As such, the update management module (210) may determine (214) whether the available system update should be blocked by inspecting information contained in the update descriptor (206) to identify system configurations (224, 226, 228) that will be impacted by the available system configuration, by inspecting information contained in the update descriptor (206) to identify whether performing the available system configuration requires a reboot of the computing system (208), and so on.

Consider an example in which a particular system configuration setting (224) indicates that the a web browser installed on the computing system (208) makes use of JavaScript™ and the update descriptor (204) associated with an available system update indicates that the system update includes an update to a version of JavaScript™ installed on the computing system (208) and that such an update requires a system reboot to complete. In such an example, the update management module (210) may affirmatively (216) determine (214) that performance of the available system update should be blocked, as updating the version of JavaScript™ installed on the computing system (208) may not warrant rebooting the computing system (208) and pausing the execution of more critical processing jobs.

The example method depicted in FIG. 2 also includes determining (218), by the update management module (210), whether the computing system (208) can be reconfigured such that the computing system (208) does not operate using the targeted system configuration (206). In the example method depicted in FIG. 2, some system configuration settings (224, 226, 228) may be optional in the sense that the system configuration settings (224, 226, 228) merely extend the functionality of the computing system (208) in ways that are not required, the system configuration settings (224, 226, 228) enable functionality that may be achieved in other ways, and so on. As such, some of the system configuration settings (224, 226, 228) may not be absolutely crucial to system performance and may be disabled, or replaced by alternative system configuration settings (224, 226, 228), without impacting the ability of the computing system (208) to performed its more critical operations in a manner that is unacceptable to the update management module (210).

Consider the example described above in which a particular system configuration setting (224) indicates that the a web browser installed on the computing system (208) makes use of JavaScript™ and the targeted system configuration (206) indicates that the system update includes an update to a version of JavaScript™ installed on the computing system (208). In such an example, if it is not absolutely critical that the web browser installed on the computing system (208) makes use of JavaScript™, the computing system (208) can be reconfigured such that the computing system (208) does not operate using the targeted system configuration (206) by simply disabling the use of JavaScript™ by the web browser.

In the example method depicted in FIG. 2, each system configuration setting (224, 226, 228) may therefore be associated with a criticality level that identifies how critical it is that the computing system (208) have a particular system configuration setting (224, 226, 228) enabled. For example, a system configuration setting (224, 226, 228) that identifies a particular device driver to be used by a network adapter installed in the computing system (208) may be more critical than a system configuration setting (224, 226, 228) that identifies a particular plugin to be used by a web browser installed in the computing system (208), as the ability of the computing system to maintain network connectivity may be deemed to be more critical that the ability of the computing system to play videos in a web browser.

The example method depicted in FIG. 2 also includes reconfiguring (222), by the update management module (210), the computing system (208) to operate without using the targeted system configuration (206). Readers will appreciate that by reconfiguring (222) the computing system (208) to operate without using the targeted system configuration (206), the system update associated with the update descriptor (204) may not need to be installed, thereby eliminating an potential need to reboot the computing system (208) in order to complete the system update.

Consider the example described above in which a particular system configuration (224) indicates that the a web browser installed on the computing system (208) makes use of JavaScript™ and the targeted system configuration (206) indicates that the system update includes an update to a version of JavaScript™ installed on the computing system (208). In such an example, by reconfiguring (222) the computing system (208) such that the use of JavaScript™ by the web browser is disabled, it may no longer be necessary to the system update associated with the update descriptor (204). Reconfiguring (222) the computing system (208) to operate without using the targeted system configuration (206) may therefore eliminate the need to utilize valuable processing resources or reboot the computing system (208) in order to install an update that may not be critical to the operation of the computing system (208).

In the example method depicted in FIG. 2, reconfiguring (222) the computing system (208) to operate without using the targeted system configuration (206) may be carried out, for example, by the update management module (210) changing one or more system configuration settings (224, 226, 228) such that the components of the computing system that are impacted by the system update are no longer utilized by the computing system (208), thereby eliminating the need to update such components. In the example method depicted in FIG. 2, reconfiguring (222) the computing system (208) to operate without using the targeted system configuration (206) is carried out in response to affirmatively (220) determining that the computing system (208) can be reconfigured such that the computing system (208) does not operate using the targeted system configuration (206).

Figure 3:
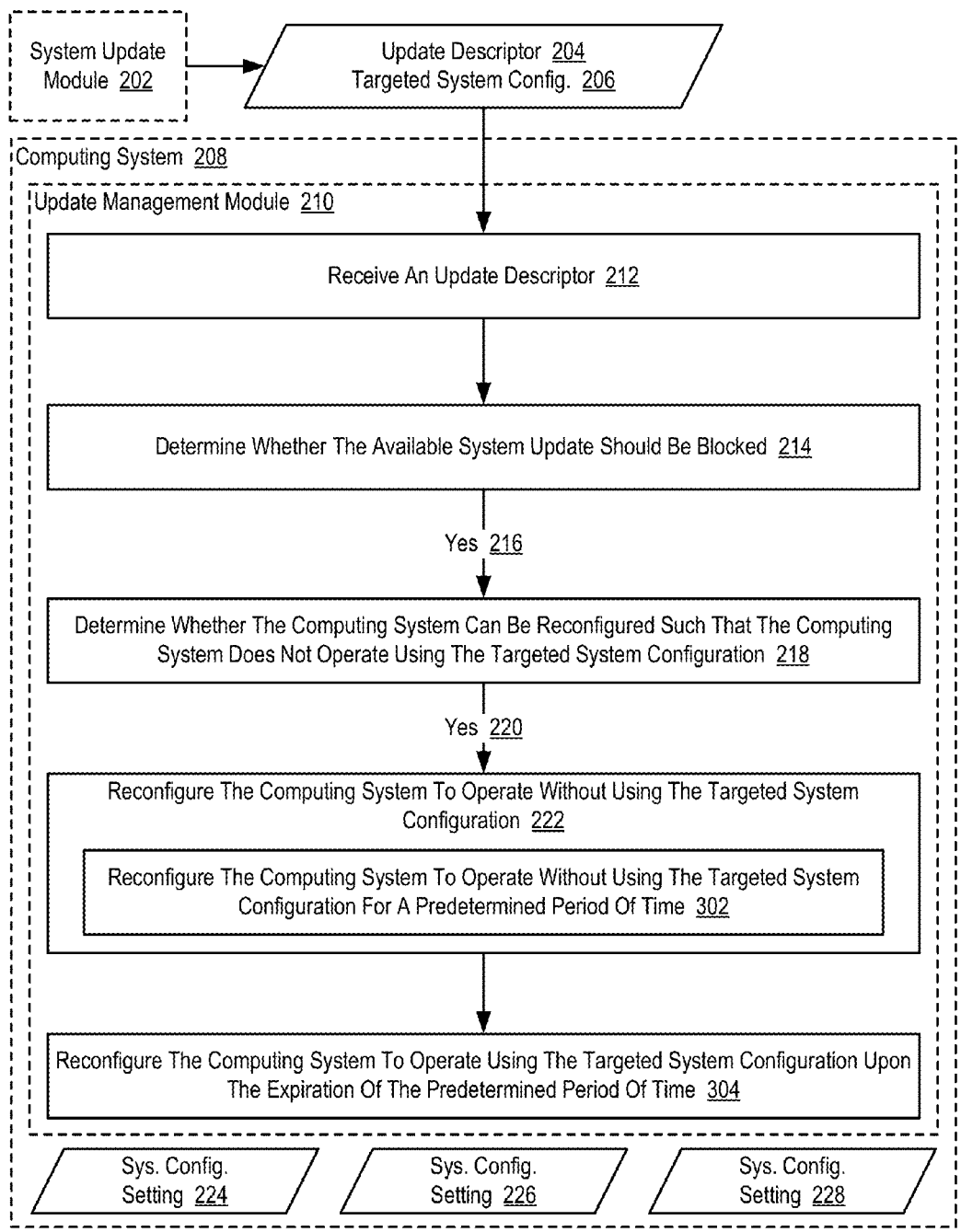
FIG. 3 sets forth a flow chart illustrating an additional example method for configuring a computing system to delay a system update according to embodiments of the present invention.

For further explanation, FIG. 3 sets forth a flow chart illustrating an additional example method for configuring a computing system (208) to delay a system update according to embodiments of the present invention. The example method depicted in FIG. 3 is similar to the example method depicted in FIG. 2, as the example method depicted in FIG. 3 also includes receiving (212) an update descriptor (204) associated with an available system update, determining (214) whether the available system update should be blocked, determining (218) whether the computing system (208) can be reconfigured such that the computing system (208) does not operate using the targeted system configuration (206), and reconfiguring (222) the computing system (208) to operate without using the targeted system configuration (206).

In the example method depicted in FIG. 3, reconfiguring (222) the computing system (208) to operate without using the targeted system configuration (206) can include reconfiguring (302) the computing system (208) to operate without using the targeted system configuration (206) for a predetermined period of time. In the example method depicted in FIG. 3, the computing system (208) may be in the process of completing an important processing job, such that installing a system update may not be preferable at a particular time. Upon completing the important processing job, however, the computing system (208) may be free to perform a system update. As such, the update management module (210) may reconfigure (302) the computing system (208) to operate without using the targeted system configuration (206) for a predetermined period of time, thereby preventing the computing system (208) from completing a system update associated with the update descriptor (204) during the predetermined period of time. In such a way, the computing system (208) may have sufficient time to complete important processing jobs prior to installing a system update and potentially rebooting the computing system (208) or otherwise utilizing important system resources.

The example method depicted in FIG. 3 also includes reconfiguring (304) the computing system (208) to operate using the targeted system configuration (206) upon the expiration of the predetermined period of time. Reconfiguring (304) the computing system (208) to operate using the targeted system configuration (206) may be carried, for example, by changing one or more system configuration settings (224, 226, 228) back to previous values upon the expiration of the predetermined period of time. In such a way, once the predetermined period of time has expired, the computing system (208) may be changed back to its previous configuration and the computing system (208) may be free to perform a system update that was originally avoided by the configuration changes that were made in step 222.

Figure 4:
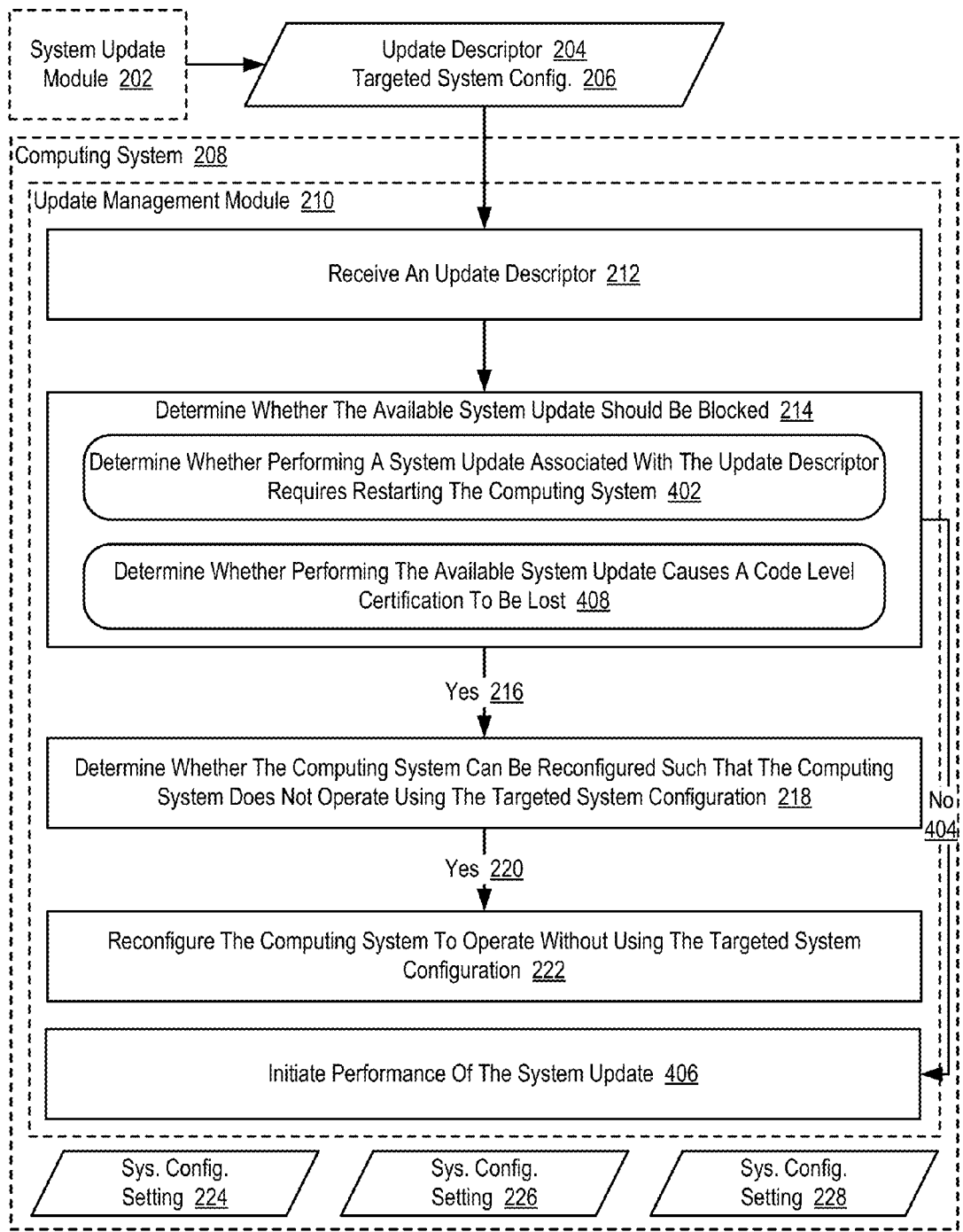
FIG. 4 sets forth a flow chart illustrating an additional example method for configuring a computing system to delay a system update according to embodiments of the present invention.

For further explanation, FIG. 4 sets forth a flow chart illustrating an additional example method for configuring a computing system (208) to delay a system update according to embodiments of the present invention. The example method depicted in FIG. 4 is similar to the example method depicted in FIG. 2, as the example method depicted in FIG. 4 also includes receiving (212) an update descriptor (204), determining (214) whether the available system update should be blocked, determining (218) whether the computing system (208) can be reconfigured such that the computing system (208) does not operate using the targeted system configuration (206), and reconfiguring (222) the computing system (208) to operate without using the targeted system configuration (206).

In the example method depicted in FIG. 4, determining (214) whether the available system update should be blocked can include determining (402), by the update management module (210), whether performing a system update associated with the update descriptor (204) requires restarting the computing system (208). The update descriptor (204) can include a wide variety of information including, for example, a field-value pair used to indicate whether the system update associated with the update descriptor (204) requires a restart of the computing system (208) in order for the system update to be completed. The update management module (210) may therefore determine (402) whether performing a system update associated with the update descriptor (204) requires restarting the computing system (208) by inspecting a field-value pair contained in the update descriptor (204).

In the example method depicted in FIG. 4, determining (214) whether the available system update should be blocked can alternatively include determining (408), by the update management module (210), whether performing the available system update causes a code level certification to be lost. In the example method depicted in FIG. 4, a code level certification may represent approval to use a particular version of some software on the computing system (208). For example, a first version of an operating system may be approved by a system administrator for use on the computing system (208) while a second version of the operating system may not be approved by the system administrator for use on the computing system (208). The second version of the operating system may not be approved by the system administrator for use on the computing system (208), for example, because the second version of the operating system is not compatible with other software installed on the computing system, because the second version of the operating system has not been evaluated by the system administrator, or for any other reason. In such an example, performing an available system update that changes the version of some piece of software installed on the computing system (208) to a version that has not been approved may cause a code level certification to be lost. In order to maintain a code level certification, the system update should therefore be blocked. In the example method of FIG. 4, determining (408) whether performing the available system update causes a code level certification to be lost may be carried out, for example, by the update management module (210) comparing information contained in the update descriptor (204) that identifies versions of software components to be installed by the available system update to information maintained by the update management module (210) that identifies approved versions of software components that may be installed on the computing system (208).

The example method depicted in FIG. 4 also includes initiating (406), by the update management module (210), performance of the system update associated with the update descriptor (204). In the example method depicted in FIG. 4, initiating (406) performance of the system update associated with the update descriptor (204) may be carried out in response to determining that the available system update should not (404) be blocked. In such an example, the available system update should not (404) be blocked, for example, because performing the available system update does not require the computing system (208) to be rebooted, because performing the available system update does not cause a code level certification to be lost, and so on. In view of the fact that some system updates do not place significant burdens on the computing system (208), performing such system updates may not be so burdensome to the computing system (208) that such system updates should be blocked from being performed.

Figure 5:
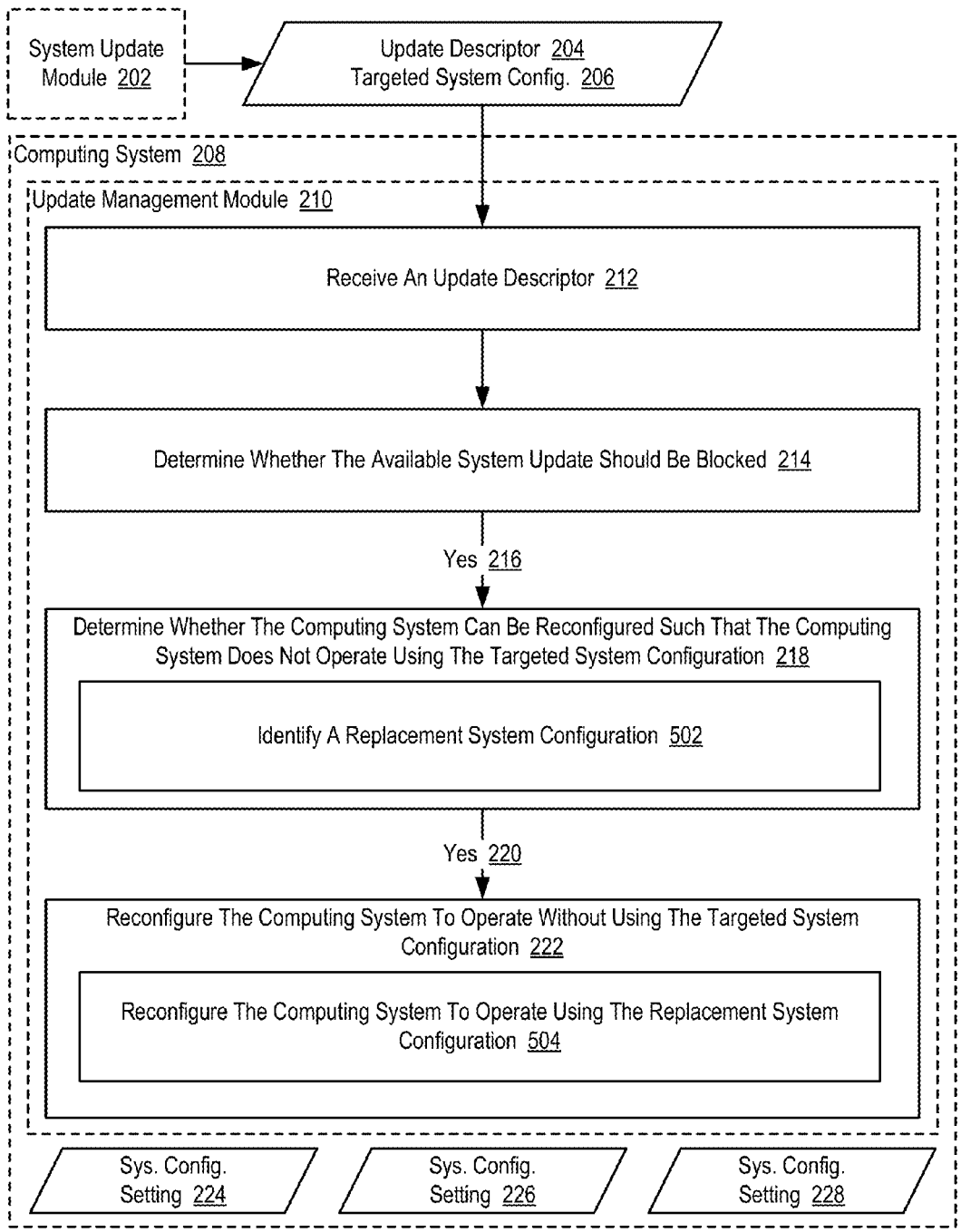
FIG. 5 sets forth a flow chart illustrating an additional example method for configuring a computing system to delay a system update according to embodiments of the present invention.

For further explanation, FIG. 5 sets forth a flow chart illustrating an additional example method for configuring a computing system (208) to delay a system update according to embodiments of the present invention. The example method depicted in FIG. 5 is similar to the example method depicted in FIG. 2, as the example method depicted in FIG. 5 also includes receiving (212) an update descriptor (204), determining (214) whether the available system update should be blocked, determining (218) whether the computing system (208) can be reconfigured such that the computing system (208) does not operate using the targeted system configuration (206), and reconfiguring (222) the computing system (208) to operate without using the targeted system configuration (206).

In the example method depicted in FIG. 5, determining (218) whether the computing system (208) can be reconfigured such that the computing system (208) does not operate using the targeted system configuration (206) can include identifying (502), by the update management module (210), a replacement system configuration. In the example method depicted in FIG. 5, a replacement system configuration represents a system configuration that carries out similar or alternative functions as the targeted system configuration (206) that will be impacted by the available system update.

Consider an example in which the update descriptor (204) includes a targeted system configuration (206) indicating that a particular video player is targeted for updating by an available system update. In such an example, assume that the computing system (208) utilizes the particular video player as its default player. The replacement system configuration in such an example could identify another video player installed on the computing system (208) as its default player.

In an additional example, the update descriptor (204) may include a targeted system configuration (206) that identifies a RAID 5 array as being targeted for updating by an available system update. In such an example, assume that the computing system (208) utilizes a RAID 5 array. The replacement system configuration in such an example could identify a RAID 6 array.

In the example method depicted in FIG. 5, reconfiguring (222) the computing system (208) to operate without using the targeted system configuration (206) can include reconfiguring (504) the computing system (208) to operate using the replacement system configuration. Reconfiguring (504) the computing system (208) to operate using the replacement system configuration may be carried out, for example, by the update management module (210) changing one or more system configuration settings (224, 226, 228) such that the computing system (208) uses the replacement system configuration, thereby eliminating the need to perform the available system update.

Referring again to the example in which the update descriptor (204) includes a targeted system configuration (206) indicating that a particular video player is targeted for updating by an available system update, reconfiguring (504) the computing system (208) to operate using the replacement system configuration may be carried out by changing one or more system configuration settings (224, 226, 228) such that the computing system (208) is to utilize another video player installed on the computing system (208) as its default player. Likewise, referring again to the example in which the update descriptor (204) includes a targeted system configuration (206) that identifies a RAID 5 array as being targeted for updating by an available system update, reconfiguring (504) the computing system (208) to operate using the replacement system configuration may be carried out by changing one or more system configuration settings (224, 226, 228) such that memory devices utilized by the computing system (208) are reorganized as a RAID 6 array.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of configuring a computing system to delay a system update, the method comprising:
   receiving, by an update management module, an update descriptor associated with an available system update, the update descriptor including information identifying a targeted system configuration to be updated by the available system update;
   determining, by the update management module, whether the available system update should be blocked;
   responsive to determining that the available system update should be blocked, determining, by the update management module, whether the computing system can be reconfigured such that the computing system does not operate using the targeted system configuration; and responsive to determining that the computing system can be reconfigured such that the computing system does not operate using the targeted system configuration, reconfiguring, by the update management module, the computing system to operate without using the targeted system configuration.

2. The method of claim 1 wherein reconfiguring the computing system to operate without using the targeted system configuration further comprises reconfiguring the computing system to operate without using the targeted system configuration for a predetermined period of time.

3. The method of claim 2 further comprising reconfiguring the computing system to operate using the targeted system configuration upon the expiration of the predetermined period of time.

4. The method of claim 1 wherein determining whether the available system update should be blocked further comprises determining, by the update management module, whether performing the available system update requires restarting the computing system.

5. The method of claim 1 wherein determining whether the available system update should be blocked further comprises determining, by the update management module, whether performing the available system update causes a code level certification to be lost.

6. The method of claim 1 wherein:
determining whether the computing system can be reconfigured such that the computing system does not operate using the targeted system configuration further comprises identifying, by the update management module, a replacement system configuration; and
reconfiguring the computing system to operate without using the targeted system configuration further comprises reconfiguring, by the update management module, the computing system to operate using the replacement system configuration.

7. An apparatus for configuring a computing system to delay a system update, the apparatus comprising a computer processor, a computer memory operatively coupled to the computer processor, the computer memory having disposed within it computer program instructions that, when executed by the computer processor, cause the apparatus to carry out the steps of:
receiving, by an update management module, an update descriptor associated with an available system update, the update descriptor including information identifying a targeted system configuration to be updated by the available system update;
determining, by the update management module, whether the available system update should be blocked;
responsive to determining that the available system update should be blocked, determining, by the update management module, whether the computing system can be reconfigured such that the computing system does not operate using the targeted system configuration; and
responsive to determining that the computing system can be reconfigured such that the computing system does not operate using the targeted system configuration, reconfiguring, by the update management module, the computing system to operate without using the targeted system configuration.

8. The apparatus of claim 7 wherein reconfiguring the computing system to operate without using the targeted system configuration further comprises reconfiguring the computing system to operate without using the targeted system configuration for a predetermined period of time.

9. The apparatus of claim 8 further comprising computer program instructions that, when executed by the computer processor, cause the apparatus to carry out the step of reconfiguring the computing system to operate using the targeted system configuration upon the expiration of the predetermined period of time.

10. The apparatus of claim 7 wherein determining whether the available system update should be blocked further comprises determining, by the update management module, whether performing the available system update requires restarting the computing system.

11. The apparatus of claim 7 wherein determining whether the available system update should be blocked further comprises determining, by the update management module, whether performing the available system update causes a code level certification to be lost.

12. The apparatus of claim 7 wherein:
determining whether the computing system can be reconfigured such that the computing system does not operate using the targeted system configuration further comprises identifying, by the update management module, a replacement system configuration; and
reconfiguring the computing system to operate without using the targeted system configuration further comprises reconfiguring, by the update management module, the computing system to operate using the replacement system configuration.

13. A computer program product for configuring a computing system to delay a system update, the computer program product disposed upon a non-transitory computer readable medium, the computer program product comprising computer program instructions that, when executed, cause a computer to carry out the steps of:
receiving, by an update management module, an update descriptor associated with an available system update, the update descriptor including information identifying a targeted system configuration to be updated by the available system update;
determining, by the update management module, whether the available system update should be blocked;
responsive to determining that the available system update should be blocked, determining, by the update management module, whether the computing system can be reconfigured such that the computing system does not operate using the targeted system configuration; and
responsive to determining that the computing system can be reconfigured such that the computing system does not operate using the targeted system configuration, reconfiguring, by the update management module, the computing system to operate without using the targeted system configuration.

14. The computer program product of claim 13 wherein reconfiguring the computing system to operate without using the targeted system configuration further comprises reconfiguring the computing system to operate without using the targeted system configuration for a predetermined period of time.

15. The computer program product of claim 14 further comprising computer program instructions that, when executed, cause the computer to carry out the step of reconfiguring the computing system to operate using the targeted system configuration upon the expiration of the predetermined period of time.

16. The computer program product of claim 13 wherein determining whether the available system update should be blocked further comprises determining, by the update management module, whether performing the available system update requires restarting the computing system.

17. The computer program product of claim 13 wherein determining whether the available system update should be blocked further comprises determining, by the update management module, whether performing the available system update causes a code level certification to be lost.

18. The computer program product of claim 13 wherein:
   determining whether the computing system can be reconfigured such that the computing system does not operate using the targeted system configuration further comprises identifying, by the update management module, a replacement system configuration; and
   reconfiguring the computing system to operate without using the targeted system configuration further comprises reconfiguring, by the update management module, the computing system to operate using the replacement system configuration.

19. The computer program product of claim 13 wherein the computer readable medium comprises a storage medium.

* * * * *